United States Patent
Glickman et al.

(10) Patent No.: US 11,117,464 B2
(45) Date of Patent: Sep. 14, 2021

(54) DOOR OPENING MODULES FOR VEHICLE FUEL SYSTEMS

(71) Applicant: FORD GLOBAL TECHNOLOGIES, LLC, Dearborn, MI (US)

(72) Inventors: David Brian Glickman, Southfield, MI (US); Scott Shaw, Plymouth, MI (US); Kosta Papanikolaou, Huntington Woods, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 173 days.

(21) Appl. No.: 16/456,488

(22) Filed: Jun. 28, 2019

(65) Prior Publication Data

US 2020/0406746 A1    Dec. 31, 2020

(51) Int. Cl.
*B60K 15/05*     (2006.01)
*B62D 25/24*     (2006.01)
*E05F 15/616*    (2015.01)
*E05F 15/60*     (2015.01)

(52) U.S. Cl.
CPC ............... *B60K 15/05* (2013.01); *B62D 25/24* (2013.01); *E05F 15/60* (2015.01); *E05F 15/616* (2015.01); *B60K 2015/053* (2013.01); *B60K 2015/0538* (2013.01); *E05Y 2900/534* (2013.01)

(58) Field of Classification Search
CPC ...................................................... B60K 15/05
USPC ...................................................... 296/97.22
See application file for complete search history.

(56) References Cited

U.S. PATENT DOCUMENTS

| | | | |
|---|---|---|---|
| 6,189,959 B1* | 2/2001 | VanAssche | B60K 15/05 16/86 B |
| 6,739,633 B2 | 5/2004 | Holloway et al. | |
| 9,038,499 B2 | 5/2015 | Ishiguro | |
| 10,240,542 B1 | 3/2019 | Salter et al. | |
| 2005/0146157 A1 | 7/2005 | Leitner | |
| 2012/0049565 A1* | 3/2012 | Saito | B60L 50/16 296/97.22 |
| 2015/0059870 A1* | 3/2015 | Iwaya | F02M 25/0809 137/351 |
| 2017/0066321 A1* | 3/2017 | Szawarski | B60K 15/05 |
| 2017/0174074 A1* | 6/2017 | Wakamatsu | B60K 15/03519 |
| 2018/0079297 A1* | 3/2018 | Lee | B60K 15/05 |

FOREIGN PATENT DOCUMENTS

| | | |
|---|---|---|
| IN | 201641021123 A | 6/2018 |
| KR | 19980044457 U | 9/1998 |
| KR | 20060024269 A | 3/2006 |

* cited by examiner

*Primary Examiner* — Dennis H Pedder
(74) *Attorney, Agent, or Firm* — David Coppiellie; Carlson, Gaskey & Olds

(57) ABSTRACT

This disclosure is directed to vehicle fuel systems that include door opening modules for controlling a fuel door opening sequence. An exemplary door opening module may include an actuator (e.g., a motor, an electromagnet, a solenoid, etc.) for automatically moving the fuel door to an ajar position after a fuel tank depressurization sequence is completed. Sound messages may be communicated to a user during the depressurization sequence by an audio actuator.

16 Claims, 9 Drawing Sheets

DOOR OPENING MODULES FOR VEHICLE FUEL SYSTEMS

TECHNICAL FIELD

This disclosure relates to vehicle fuel systems, and more particularly to door opening modules for controlling fuel door opening sequences of fuel doors of the fuel systems.

BACKGROUND

Many automotive vehicles include fuel systems. A fuel door assembly of the fuel systems provides access to a fuel inlet conduit for refueling the vehicle.

SUMMARY

A fuel system for a vehicle according to an exemplary aspect of the present disclosure includes, among other things, a fuel tank, a fuel door, a door opening module configured to move the fuel door, and a control system configured to command the door opening module to move the fuel door to an ajar position when a pressure of the fuel tank is within a predefined pressure range.

In a further non-limiting embodiment of the foregoing fuel system, an audio actuator is configured to broadcast sound messages prior to moving the fuel door to the ajar position.

In a further non-limiting embodiment of either of the foregoing fuel systems, the audio actuator is a vibration exciter or a speaker.

In a further non-limiting embodiment of any of the foregoing fuel systems, the control system is configured to command the audio actuator to broadcast the sound messages until the pressure reaches the predefined pressure range.

In a further non-limiting embodiment of any of the foregoing fuel systems, the door opening module includes a motor and a cam for moving the fuel door to the ajar position.

In a further non-limiting embodiment of any of the foregoing fuel systems, the motor includes a worm screw configured to engage a worm gear of the cam.

In a further non-limiting embodiment of any of the foregoing fuel systems, the cam pushes against the fuel door or a hinge arm attached to the fuel door in the ajar position and does not push against the fuel door or the hinge arm in a closed position.

In a further non-limiting embodiment of any of the foregoing fuel systems, the door opening module includes an electromagnet or a solenoid for moving the fuel door to the ajar position.

In a further non-limiting embodiment of any of the foregoing fuel systems, the door opening module includes a door opening button and a sensor configured to detect a position of the fuel door.

In a further non-limiting embodiment of any of the foregoing fuel systems, the door opening module includes a polymeric enclosure that is mounted to a rear surface of a housing of a fuel door assembly.

A vehicle according to another exemplary aspect of the present disclosure includes, among other things, a vehicle body component, a fuel door assembly mounted to the vehicle body component and including a fuel door, a fuel tank, an audio actuator mounted to the vehicle body component, and an actuator configured to move the fuel door between a closed position and an ajar position. A control system of the vehicle is configured to (a) command the audio actuator to broadcast sound messages while the fuel door is in the closed position, and (b) command the actuator to move the fuel door to the ajar position when the pressure of the fuel tank is within the predefined pressure range.

In a further non-limiting embodiment of the foregoing vehicle, the vehicle body component is a rear side panel.

In a further non-limiting embodiment of either of the foregoing vehicles, the fuel door assembly and the fuel tank are part of a Non-Integrated Refueling Canister Only System (NIRCOS).

In a further non-limiting embodiment of any of the foregoing vehicles, the audio actuator is a vibration exciter or a speaker.

In a further non-limiting embodiment of any of the foregoing vehicles, the actuator is a motor configured to engage a cam for moving the fuel door to the ajar position.

In a further non-limiting embodiment of any of the foregoing vehicles, the motor includes a worm screw configured to engage a worm gear of the cam.

In a further non-limiting embodiment of any of the foregoing vehicles, the actuator is an electromagnet or a solenoid.

In a further non-limiting embodiment of any of the foregoing vehicles, the control system commands the audio actuator to broadcast the sound messages in response to an input from a door opening button.

In a further non-limiting embodiment of any of the foregoing vehicles, a sensor is configured to detect a position of the fuel door.

A method according to another exemplary aspect of the present disclosure includes, among other things, receiving an input from a door opening button of a vehicle fuel door assembly, the input indicative of an initiation of a fuel door opening sequence. The method further includes broadcasting sound messages to a user located near the vehicle fuel door assembly during the fuel door opening sequence, and automatically moving a fuel door of the vehicle fuel door assembly to an ajar position in response to a pressure of a fuel tank reaching a predefined pressure range.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to vehicle fuel systems that include door opening modules for controlling a fuel door opening sequence. An exemplary door opening module may include an actuator (e.g., a motor, an electromagnet, a solenoid, etc.) for automatically moving the fuel door to an ajar position after a fuel tank depressurization sequence is completed. Sound messages may be communicated to a user during the depressurization sequence by an audio actuator. These and other features of this disclosure are described in greater detail below.

Figure 1:
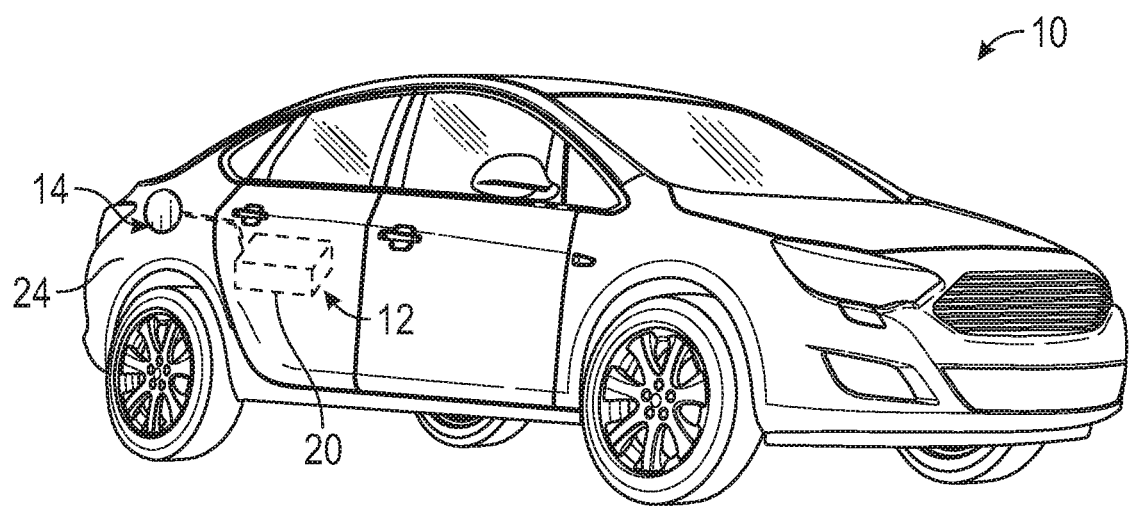
FIG. 1 schematically illustrates a vehicle equipped with a fuel system.
Figure 2:
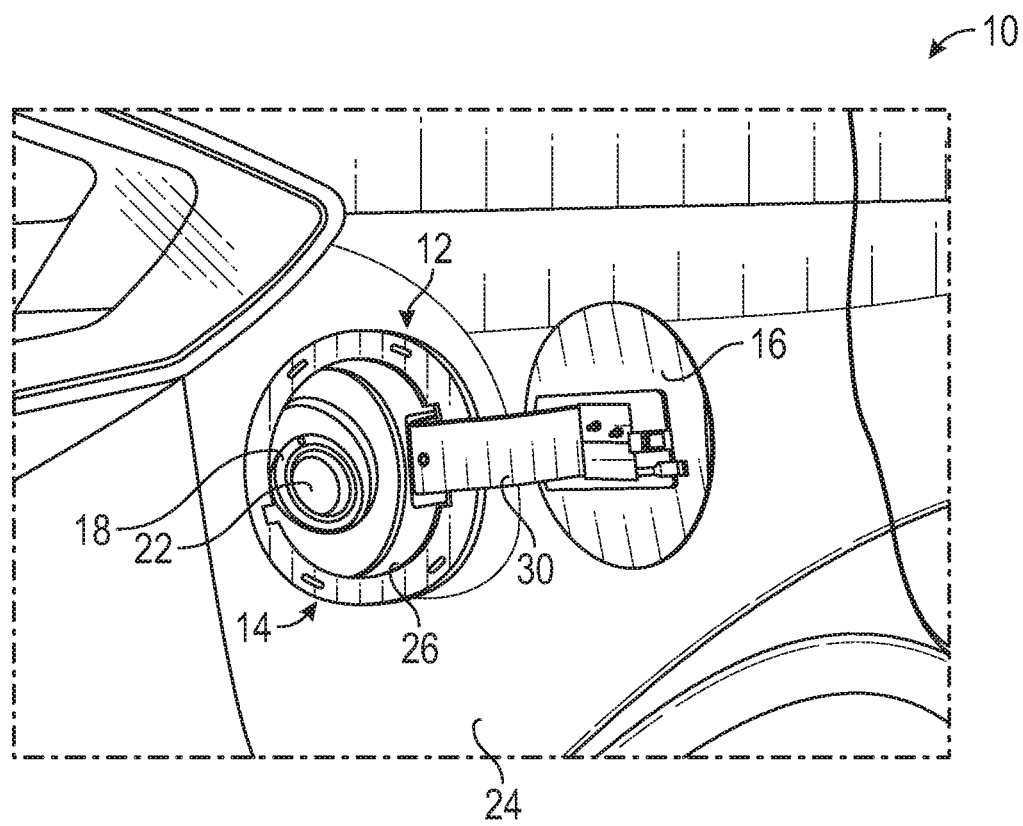
FIG. 2 illustrates a fuel door assembly of the fuel system of the vehicle of FIG. 1.

FIGS. 1 and 2 schematically illustrate a vehicle 10. The vehicle 10 could be a car, a truck, a van, a sport utility vehicle, or any other type of vehicle. The vehicle 10 could also be a conventional, internal combustion engine powered vehicle, a traction battery powered hybrid electric vehicle (HEV), a plug-in hybrid electric vehicle (PHEV), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a fuel system 12. The fuel system 12 may include, among various other components, a fuel door assembly 14 that includes a fuel door 16, a fuel inlet conduit 18, and a fuel tank 20. The fuel inlet conduit 18 includes an inlet opening 22. The fuel inlet conduit 18 may extend from the inlet opening 22 to the fuel tank 20.

The fuel door 16 is shown in an open position in FIG. 2. When the fuel door 16 is rotated to a closed position, the fuel door 16 is substantially flush to a vehicle body component, such as a rear side panel 24 of the vehicle 10, for example.

The fuel door assembly 14 may include a housing 26 that circumferentially surrounds the inlet opening 22 of the fuel inlet conduit 18. The housing 26 may extend from the fuel inlet conduit 18 to the rear side panel 24 to cover a gap between the fuel inlet conduit 18 and the vehicle body.

Figure 3:
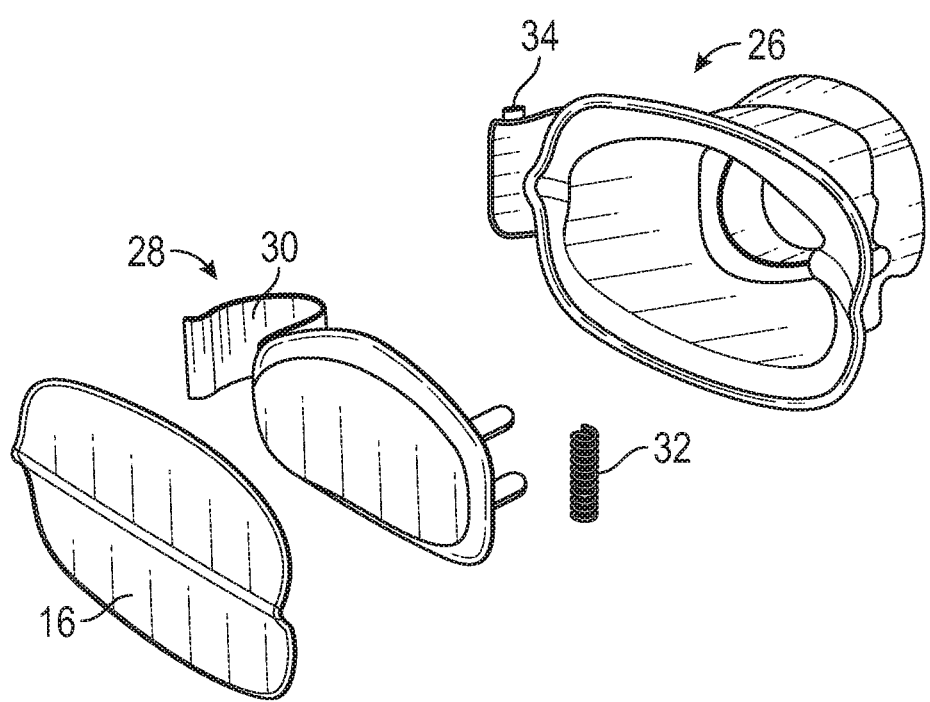
FIG. 3 is an exploded view of the fuel door assembly of FIG. 2.
Figure 4A:
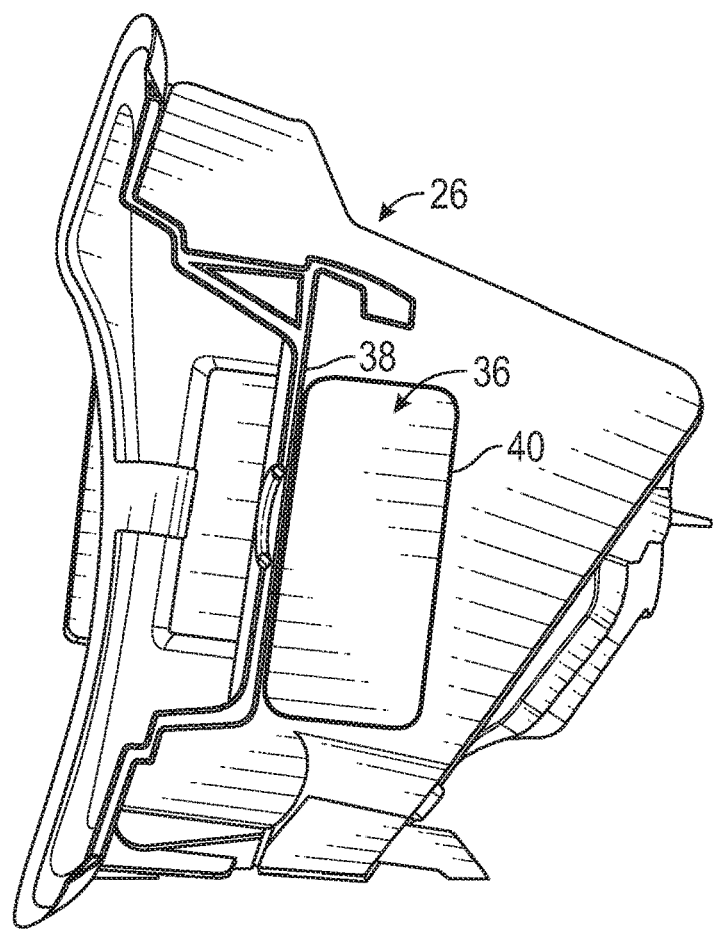
FIGS. 4A and 4B illustrate a packaging location of a door opening module of a fuel door assembly.
Figure 4B:
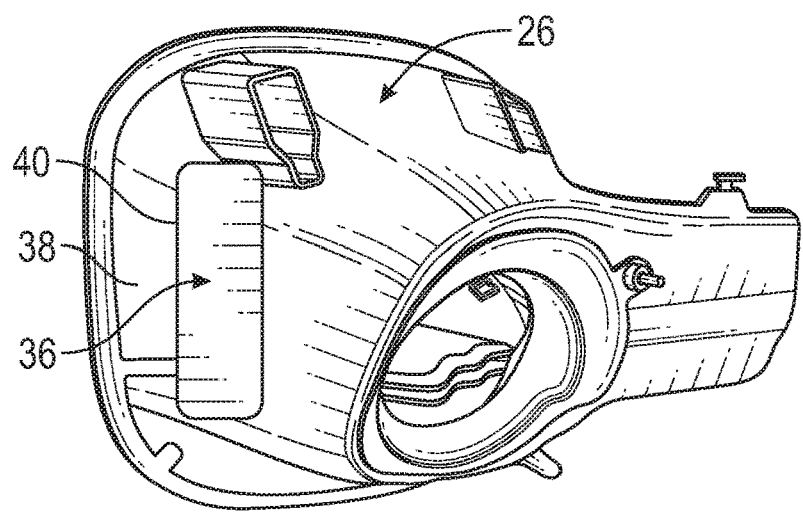
Figure 5:
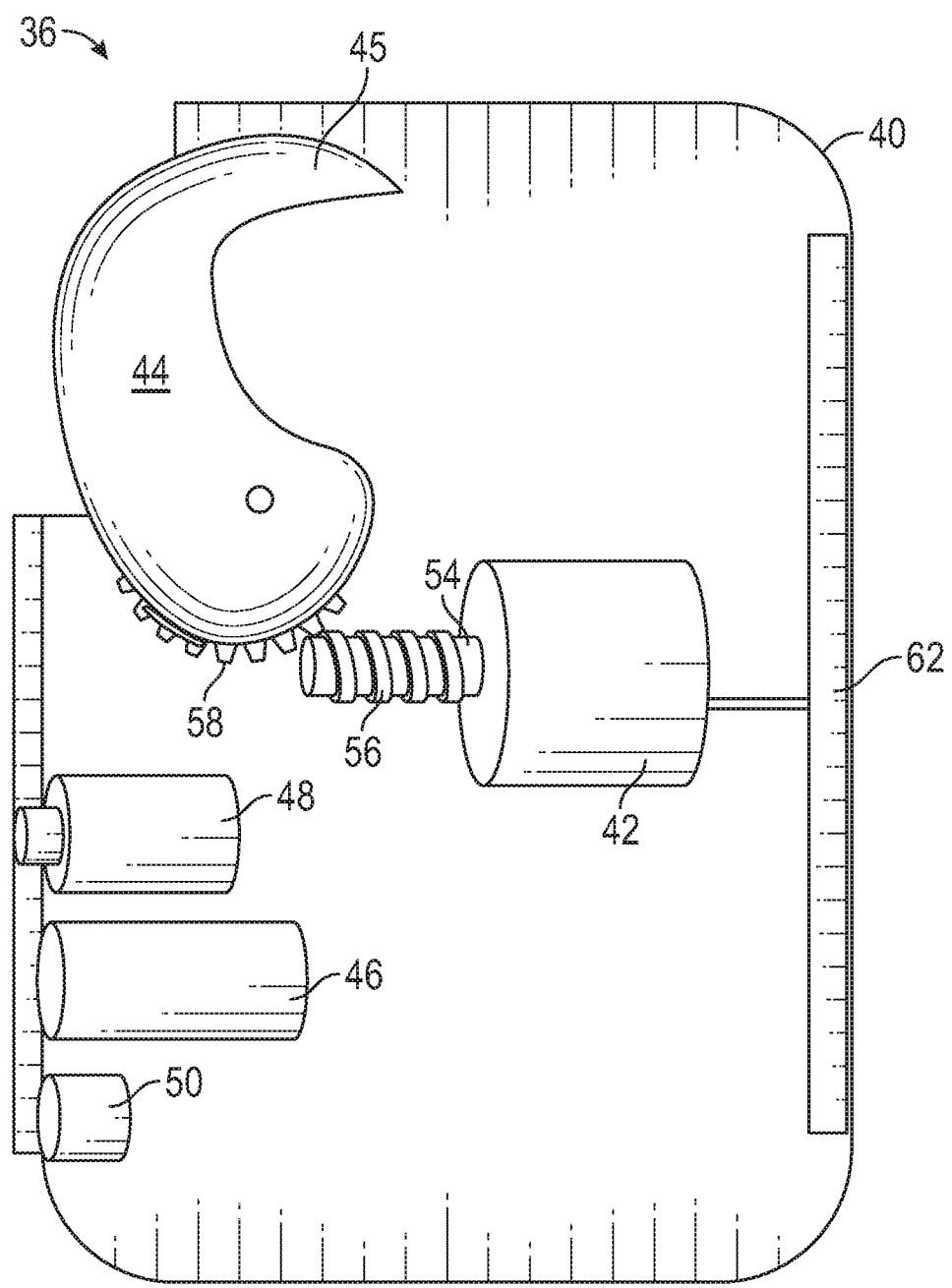
FIG. 5 is a side cutaway view of the door opening module of FIG. 4A.
Figure 6:
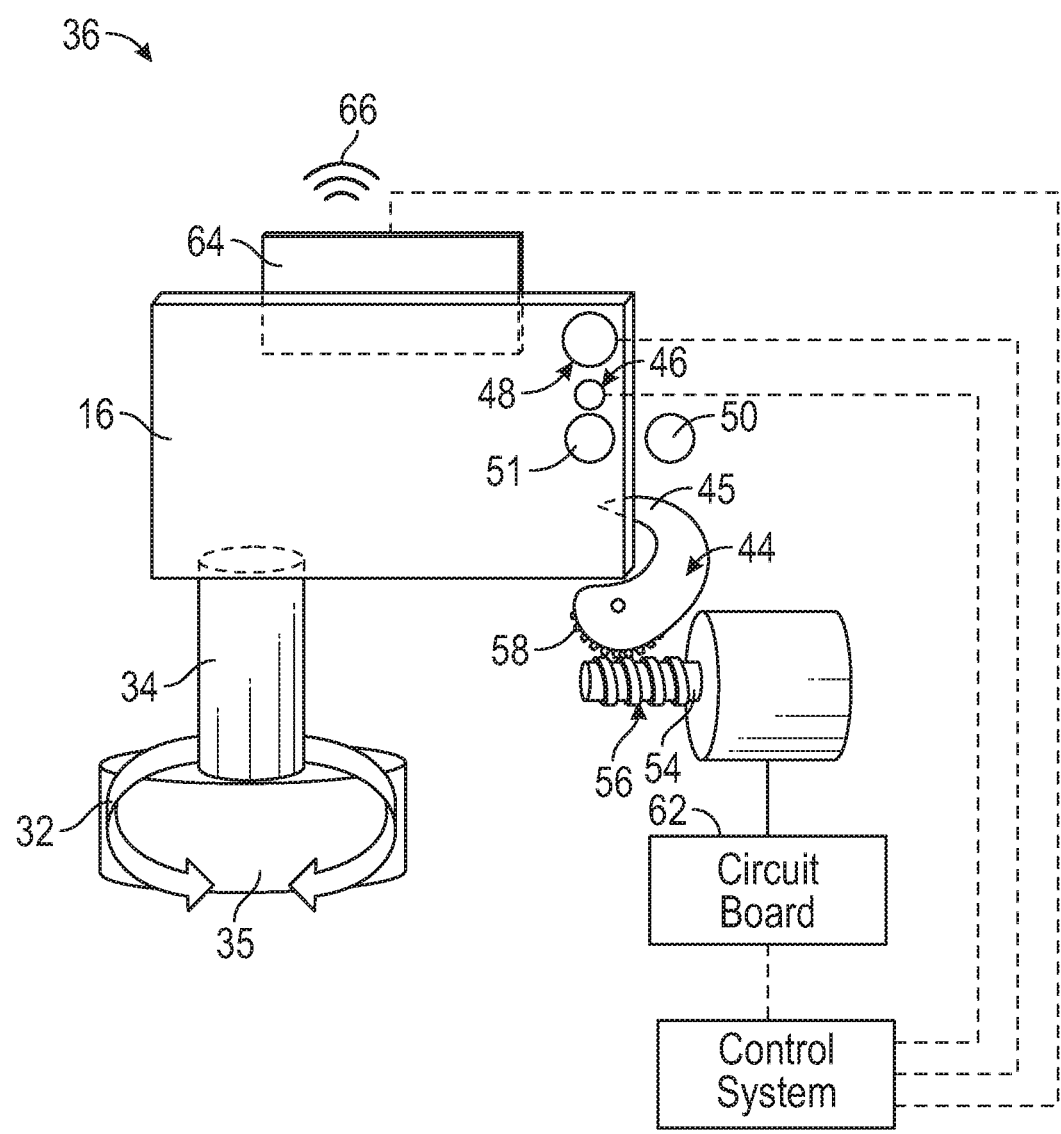
FIG. 6 is a highly schematic illustration of portions of a fuel door assembly including a door opening module according an exemplary embodiment of this disclosure.

The fuel door assembly 14 may additionally include a hinge assembly 28 (best shown in FIG. 3) having a hinge arm 30 and a hinge spring 32 received over a pivot pin 34 of the housing 26. The hinge assembly 28 may be connected to both the fuel door 16 and the housing 26 to control movement of the fuel door 16 between the open and closed positions. The hinge assembly 28 may optionally include a damper 35 (e.g., a fluid or spring damper) for soft-closing the fuel door 16 (see, e.g., FIG. 6).

The fuel system 12 may be a capless fuel system, which, for purposes of this disclosure, means that no separate cap is removably secured relative to the fuel inlet conduit 18 to seal and cover the inlet opening 22.

To refuel the fuel tank 20, a fuel dispensing nozzle (not shown) may be inserted through the inlet opening 22 of the fuel inlet conduit 18. Fuel can then be delivered from a fuel supply, through the fuel dispensing nozzle, into the fuel inlet conduit 18, and ultimately into the fuel tank 20.

In an embodiment, the fuel system 12 is designed to retain fuel vapors to meet evaporative emissions requirements. The fuel system 12 may be a Non-Integrated Refueling Canister Only System (NIRCOS). As a result, the fuel system 12 can achieve vapor pressures and vacuum levels higher than conventional fuel systems. However, the teachings of this disclosure are not limited to NIRCOS fuel systems and could apply to any fuel system for any vehicle.

The fuel system 12 can incorporate a pressure management system that ensures that a pressure within the fuel tank 20 is maintained within a particular threshold range. Adjusting the pressure within the fuel tank 20 may be required prior to refueling the fuel tank 20. For example, if the pressure is too high, reducing the pressure may be needed prior to refueling to lessen the potential for fuel vapors escaping from the fuel system 12 through the inlet opening 22. Alternatively, if the pressure is too low, increasing the pressure may be required prior to refueling to lessen the potential for a vacuum drawing contaminants into the fuel system 12 through the inlet opening 22. In an embodiment, adjusting the pressure within the fuel tank 20 can require from three to fifteen seconds. After the pressure is appropriately adjusted, the user can begin to refuel the fuel tank 20.

Users may not always successfully close the fuel door 16 after refueling the fuel tank 20, thereby preventing the fuel tank 20 from properly pressurizing. This could cause the fuel system 12 to vent the fuel vapors to the atmosphere and lead to generating a check engine light error within the vehicle 10. Accordingly, door opening modules and related methods that provide improved control of the opening and closing of the fuel door 16 are proposed within this disclosure.

An exemplary door opening module 36 for controlling the operation of the fuel door 16 of the fuel system 12 is illustrated in FIGS. 4A, 4B, 5, and 6. In an embodiment, the door opening module 36 is mounted to a rear surface 38 of the housing 26 of the fuel door assembly 14 (see, e.g., FIGS. 4A and 4B). However, other mounting locations are also contemplated within the scope of this disclosure.

The door opening module 36 may include an enclosure 40 that at least partially houses a plurality of components. In an embodiment, the enclosure 40 is constructed from one or more polymeric materials. However, the specific material make-up of the enclosure 40 is not intended to limit this disclosure.

An actuator 42, a cam 44, a sensor 46, a door opening button 48, and a magnet 50 may be packaged at least partially within the enclosure 40. The enclosure 40 may include an opening 52 (see FIG. 5) for allowing a portion of the cam 44 to move to a position outside of the enclosure 40.

The door opening module 36 can automatically delay moving the fuel door 16 to an ajar position, thereby preventing insertion of a fuel dispensing nozzle, until the fuel system 12 is within an acceptable pressure range. After the fuel system 12 adjusts the pressure of the fuel tank 20 to be within a range appropriate for refueling, the actuator 42 can be employed to move the cam 44 for positioning the fuel door 16 in the ajar position. Once in the ajar position, a user can manually move the fuel door 16 to the fully open position. The ajar position could be set at any position that is between a fully closed position and a fully open position.

In an embodiment, the actuator 42 is a motor. The actuator 42 may include a shaft 54. The shaft 54 may include a worm screw 56 configured to engage a worm gear 58 of the cam 44. As the worm screw 56 rotates to move the worm gear 58, the cam 44 may pivot to move the fuel door 16 to the ajar position.

The sensor 46 is configured to detect when the fuel door 16 is in a closed position. In an embodiment, the sensor 46 is a hall sensor. The sensor 46 may be located in the housing 26 or inside the enclosure 40 of the door opening module 36.

The door opening button 48 may be manually pushed under flush to trigger an automatic opening sequence of the fuel door 16 by the door opening module 36. The door opening button 48 may be positioned within the fuel door 16, within the enclosure 40 of the door opening module 36, or within the housing 26. Alternatively, the door opening button 48 could be provided inside the passenger cabin of the vehicle 10 (i.e., at a location that is completely remote from the fuel door assembly 14).

The magnet 50 may optionally be mounted within the enclosure 40. Another (e.g., a second) magnet 51 may optionally be mounted within the fuel door 16. The magnets 50, 51 can optionally be provided to more firmly hold the fuel door 16 in the closed position.

Movement of the actuator 42 can be controlled by a control system 60 that is operably linked to the fuel tank 20 or sensors that monitor a pressure of the fuel tank 20 and/or other areas of the fuel system 12. The control system 60 may include one or more control modules equipped with executable instructions for interfacing with and commanding operation of the various components of the fuel system 12. Each such control module may include a processing unit and non-transitory memory for executing the various control strategies of the components of the fuel system 12. The processing unit, in an embodiment, is configured to execute one or more programs stored in the memory of the control system 60. An exemplary program, when executed, may be used to initiate a fuel tank pressurization/depressurization sequence and to command movement of the fuel door 16 to the ajar position after the pressurization/depressurization is completed. The control system 60 may control various other functions associated with the fuel system 12.

In an embodiment, the control system 60 is operably linked to both a circuit board 62 of the actuator 42 and to the door opening button 48. Signals from the door opening button 48 can provide inputs to the control system 60 indicating that the user desires to refuel the vehicle 10. In response to receiving the signal(s) from the door opening button 48, the control system 60 can initiate a depressurization or vacuum reduction routine to bring the pressure of the fuel tank 20 to be within a range acceptable for refueling. The fuel door 16 is held closed during the depressurization. After brining the pressure within a predefined pressure range, the control system 60 may instruct the circuit board 62 to actuate the actuator 42, thereby pivoting the cam 44 to move the fuel door 16 to the ajar position.

Figure 7:
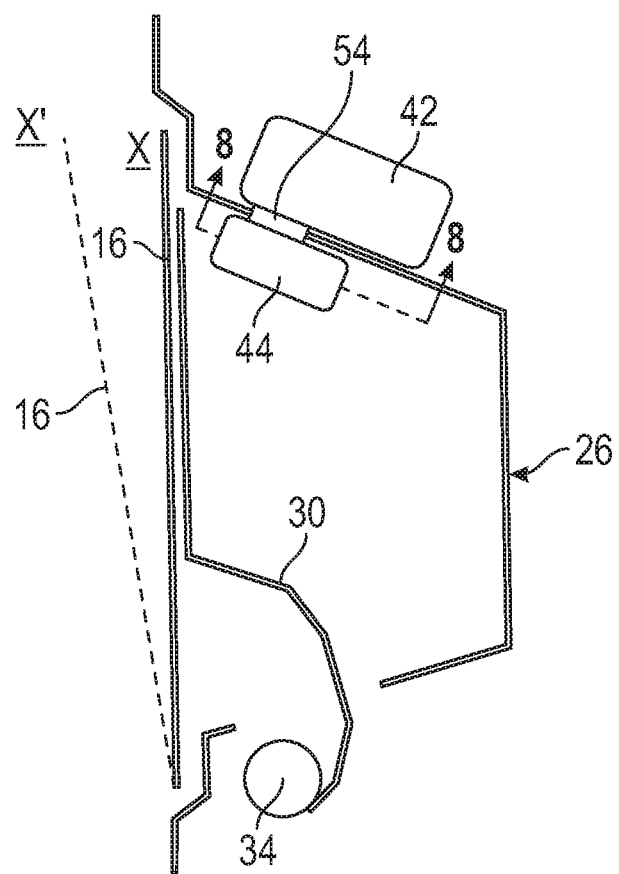
FIG. 7 is a sectional view depicting an exemplary operation of the door opening module of FIGS. 5 and 6.
Figure 8:
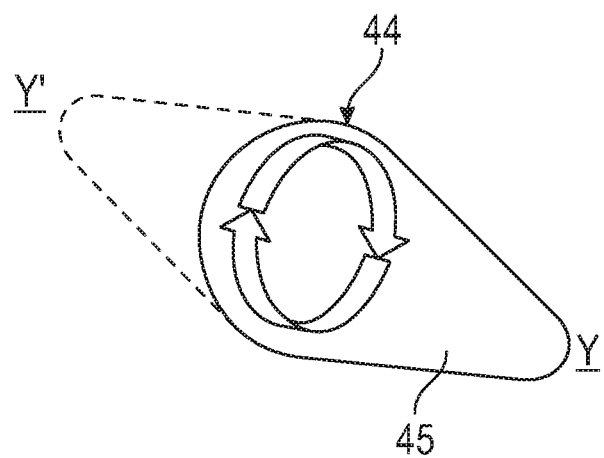
FIG. 8 is a cross-sectional view through section 8-8 of FIG. 7 and illustrates a front view of a cam of the door opening module.

Referring now primarily to FIGS. 7-8, movement of the fuel door 16 between a closed position X and an ajar position X' (shown in phantom) is illustrated. In the closed position X, the cam 44 is positioned in a first position Y (see FIG. 8). A leg 45 of the cam 44 does not push against the fuel door 16 in the first position Y.

The cam 44 may be pivoted or otherwise moved to a second position Y' (shown in phantom) to move the fuel door 16 to the ajar position X'. The leg 45 of the cam 44 pushes against the fuel door 16 (or against the hinge arm 30 that is connected to the fuel door 16) in the second position Y' in order to move the fuel door 16 to the ajar position X'. In an embodiment, the second position Y' of the cam 44 is displaced approximately 180 degrees from the first position Y of the cam 44. However, other configurations are also contemplated as being within the scope of this disclosure.

Referring again to FIG. 6, the fuel system 12 may additionally include an audio actuator 64 for communicating with a user who has indicated a desire to refuel the vehicle 10, such as by actuating the door opening button 48 of the door opening module 36. In an embodiment, the audio actuator 64 is a vibration exciter that is configured to radiate sound signals to the outside of the vehicle 10 by vibrating corresponding portions of the vehicle body component (e.g., the rear side panel 24) to which the audio actuator 64 is coupled. For example, actuation of a first portion of the audio actuator 64 may transfer the vibration energy generated by the electrical signal through a second portion of the audio actuator 64, thereby vibrating the adjacent surface of the vehicle body component. The audio actuator 64 may therefore function as a tuning fork that actuates the adjacent surface of the vehicle body component to cause that portion of the vehicle body component to form a resonant baffle of a speaker. In another embodiment, the audio actuator 64 is a speaker.

The total number of audio actuators provided on the vehicle 10 as part of the fuel system 12 is not intended to limit this disclosure. Thus, the fuel system 12 could include one or more audio actuators, as well as different types of audio actuators.

The audio actuator 64 may actuate upon receiving an electrical signal, such as an electrical signal received from the control system 60. The control system 60 may be programmed to determine when and how to actuate the audio actuator 64 for radiating sound signals to an external environment surrounding the vehicle 10.

In an embodiment, the audio actuator 64 is configured to broadcast sound messages 66 from the vehicle 10 to a nearby user for providing feedback about the status of the fuel system 12 and the fuel door 16 opening process to the user. For example, the sound messages 66 may include any sounds or combinations of sounds. The sound messages 66 may include a word or phrase, a chime, a series of chimes, or any combination of words and chimes.

In an embodiment, the sound messages 66 may include a first chime when the door opening button 48 is initially pushed, followed by a series of additional chimes, ticks, buzzes, etc. that increase in rapidity as the fuel depressurization sequence nears completion. In another embodiment, the sound messages 66 may include words or phrases including, but not limited to, "Depressurizing—Please Wait," "Door Opens in X-Amount of Seconds," "Door Unlocked, Please Begin Fueling," etc.

Figure 9:
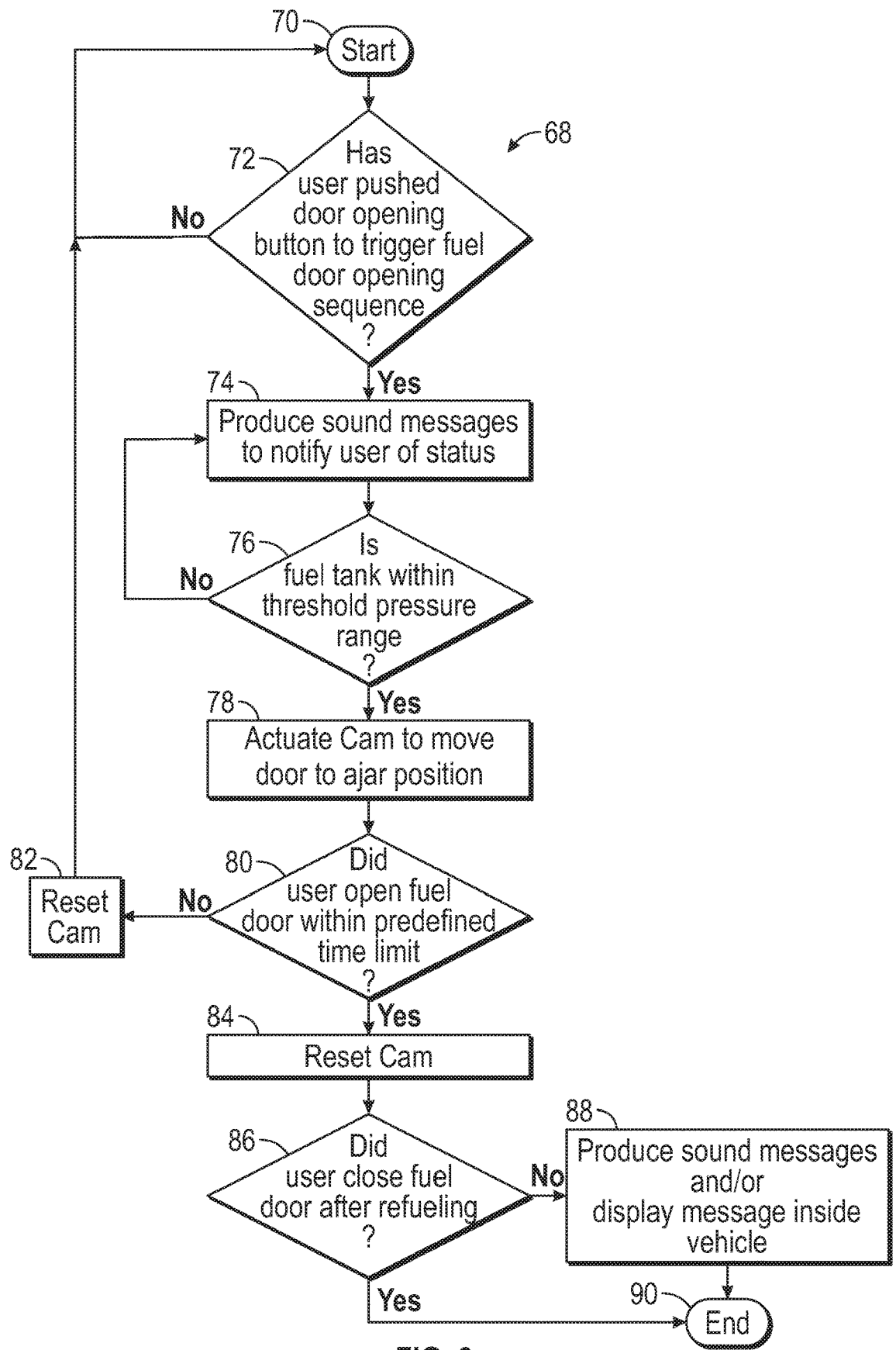
FIG. 9 schematically illustrates an exemplary vehicle method for controlling a fuel door using the door opening module of FIGS. 5 and 6.

FIG. 9, with continued reference to FIGS. 1-8, schematically illustrates an exemplary vehicle method 68 for controlling the fuel door 16 using the door opening module 36. In an embodiment, the control system 60 is programmed with one or more algorithms adapted to execute the exemplary vehicle method 68.

The exemplary method 68 begins at block 70. The fuel door 16 is closed at block 70. The control system 60 can determine that the fuel door 16 is closed based on signals from the sensor 46.

At block 72, the control system 60 determines whether a user of the vehicle 10 has pushed the door opening button 48 to trigger the opening sequence of the fuel door 16. If yes, the control system 60 commands the audio actuator 64 to begin broadcasting sound messages 66 at block 74. The sound messages 66 may be broadcast to provide feedback to the user about the status of the fuel system 12 and the fuel door 16 opening processes.

Next, at block 76, the control system 60 monitors whether the pressure of the fuel tank 20 is within a threshold pressure range. If yes, the vehicle method 68 may proceed to block 78 at which time the cam 44 may be actuated to move the fuel door 16 to the ajar position X'.

The control system 60 may next monitor whether the user has moved the fuel door 16 from the ajar position X' to a fully open position within a predefined time limit (see block 80). In an embodiment, the predefined time limit is about 30 seconds, although other time limits may alternatively be programmed. The position of the fuel door 16 may again be monitored by the sensor 46. If the fuel door 16 has been moved to the fully open position, the cam 44 may be reset to the first position Y, which may be referred to as the home position of the cam 44, at block 82.

Alternatively, if the fuel door 16 has not been moved to the fully open position within the predefined time limit, the cam 44 may be reset to the first position Y at block 84 and the control system 60 may then determine whether the user has closed the fuel door 16 after refueling at block 86. If no, the control system 60 may command the audio actuator 64 to broadcast sound messages 66 and/or display a message inside the passenger cabin at block 88. In either event, the vehicle method 68 may end at block 90.

Figure 10:
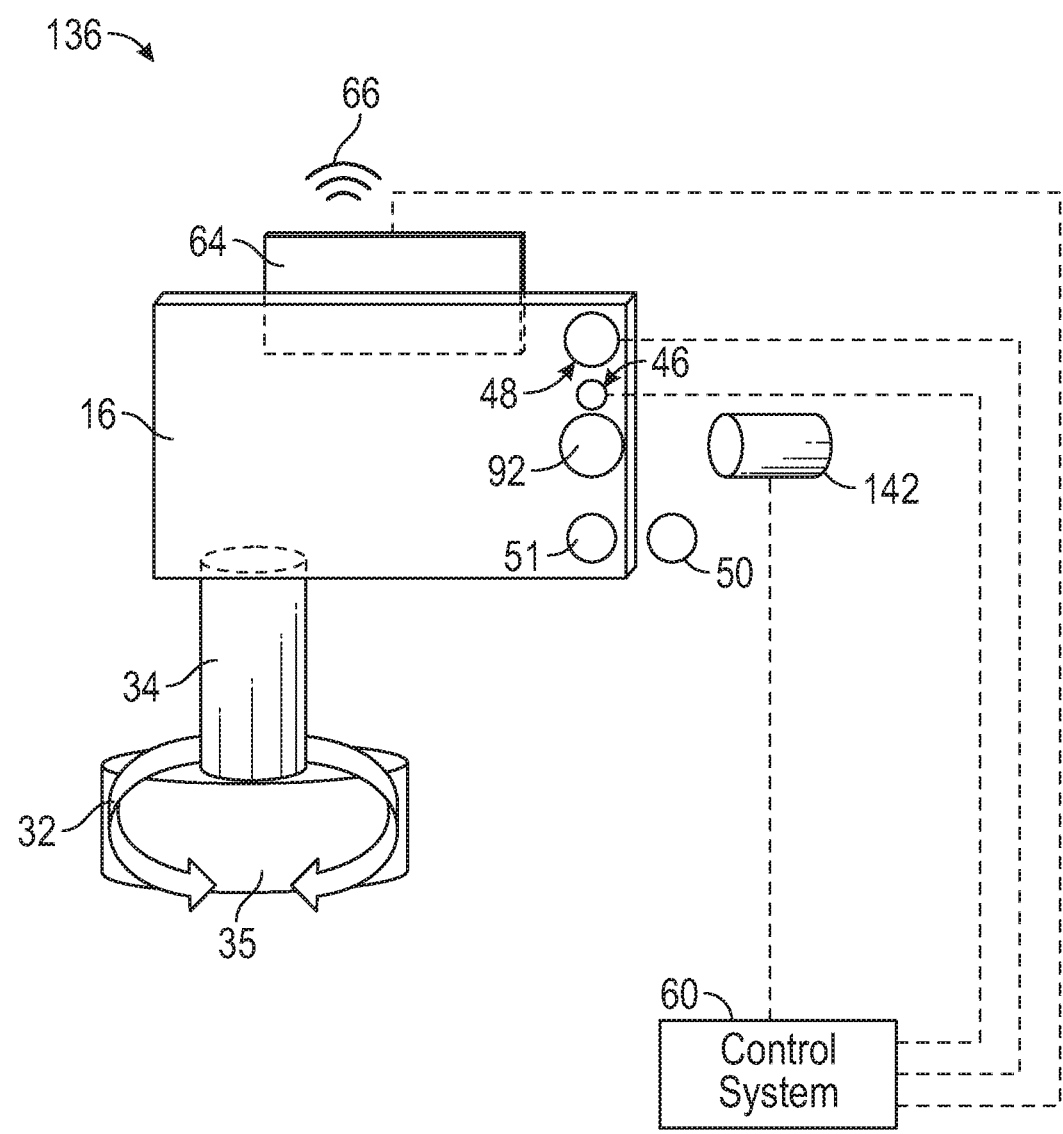
FIG. 10 is a highly schematic illustration of portions of a fuel door assembly including a door opening module according to another exemplary embodiment of this disclosure.

Another exemplary door opening module 136 for controlling the opening and closing of the fuel door 16 of the fuel system 12 is illustrated in FIG. 10. The door opening module 136 may include an actuator 142, a sensor 46, a door opening button 48, and magnets 50, 51. The door opening module 136 can automatically delay moving the fuel door 16 to an ajar position, thereby preventing insertion of a fuel dispensing nozzle, until the fuel system 12 is within an acceptable pressure range. After the fuel system 12 adjusts the pressure of the fuel tank 20 to be within a range appropriate for refueling, the actuator 142 can be employed to move the fuel door 16 to the ajar position. Once in the ajar position, a user can manually move the fuel door 16 to the fully open position. The ajar position could be set at any position that is between a fully closed position and a fully open position.

In an embodiment, the actuator 142 is an electromagnet. The electromagnet can be pulsed by the control system 60 in order to repel a magnet 92 housed in the fuel door 16, thus pushing the fuel door 16 to the ajar position. In another embodiment, the actuator 142 is a solenoid. The magnet 92 is not required if the actuator 142 is a solenoid. Instead, a solenoid pin of the actuator 142 may move the fuel door 16 ajar.

The sensor 46 is configured to detect when the fuel door 16 is in a closed position. In an embodiment, the sensor 46 is a hall sensor that is mounted within the fuel door 16. The sensor 46 could be positioned within the fuel door 16, within the enclosure 40 of the door opening module 136, or within the housing 26.

The door opening button 48 may be manually pushed under flush to trigger an automatic opening sequence of the fuel door 16 by the door opening module 136. The door opening button 48 may be positioned within the fuel door 16, within the enclosure 40 of the door opening module 36, or within the housing 26. Alternatively, the door opening button 48 could be provided inside the passenger cabin of the vehicle 10. The magnets 50, 51 may optionally be provided to more firmly hold the fuel door 16 in the closed position.

In an embodiment, the control system 60 is operably linked to both the actuator 142 and to the door opening button 48. Signals from the door opening button 48 can provide inputs to the control system 60 indicating that the user desires to refuel the vehicle 10. In response to receiving the signal(s) from the door opening button 48, the control system 60 can initiate a depressurization or vacuum reduction routine to bring the pressure of the fuel tank 20 to be within a range acceptable for refueling. The fuel door 16 is held closed during the depressurization. After brining the pressure within a predefined pressure range, the control system 60 may instruct the actuator 142 to move the fuel door 16 to the ajar position.

The control system 60 may also be operably linked to an audio actuator 64. The audio actuator 64 may be commanded to broadcast sound messages 66 to a nearby user for providing feedback about the status of the fuel system 12 and the fuel door 16 opening processes to the user.

Figure 11:
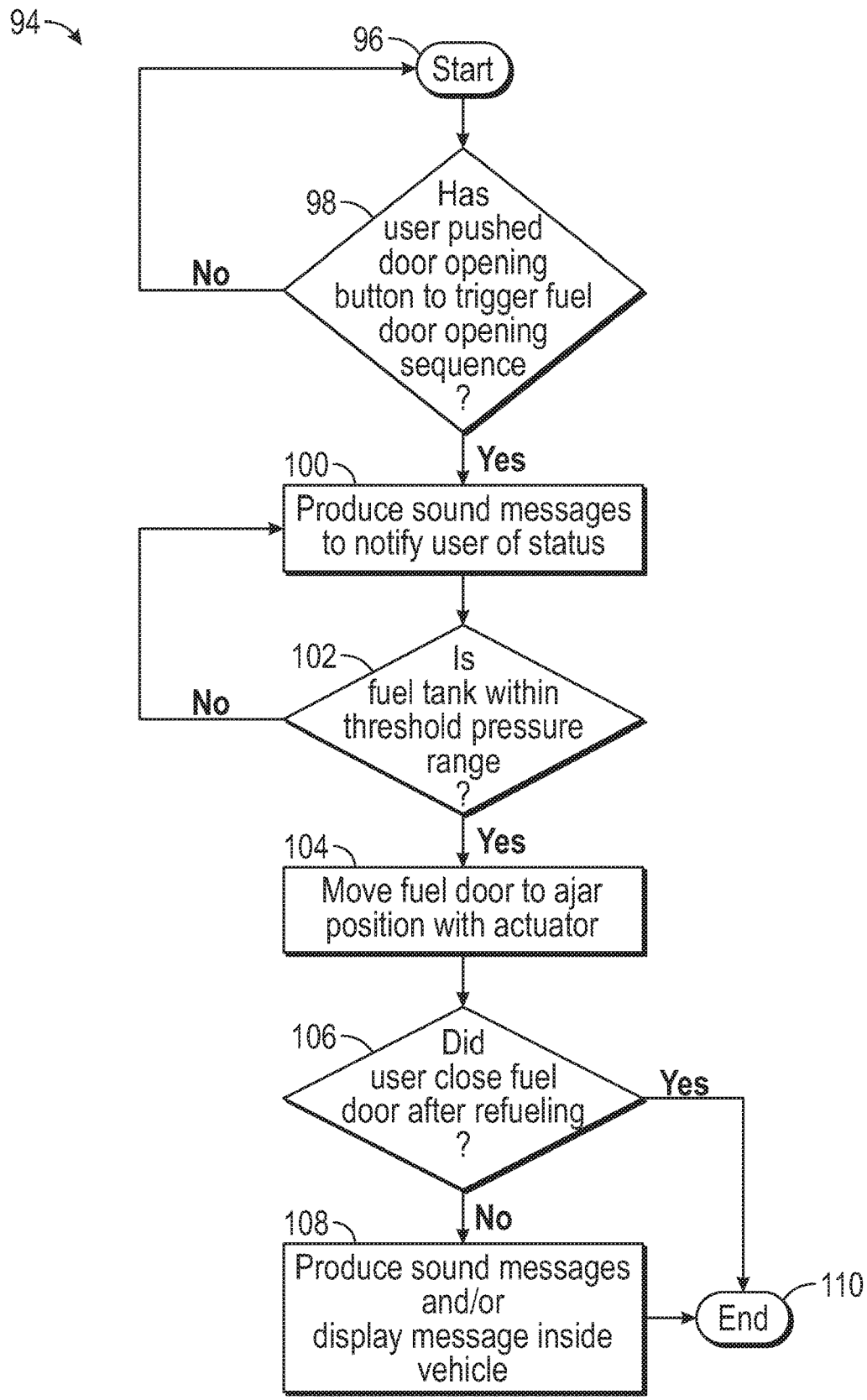
FIG. 11 schematically illustrates an exemplary vehicle method for controlling a fuel door using the door opening module of FIG. 10.

FIG. 11, with continued reference to FIG. 10, schematically illustrates an exemplary vehicle method 94 for controlling the fuel door 16 using the door opening module 136 of FIG. 10. In an embodiment, the control system 60 is programmed with one or more algorithms adapted to execute the exemplary vehicle method 94.

The exemplary method 94 may begin at block 96. The fuel door 16 is closed at block 96. The control system 60 can determine that the fuel door 16 is closed based on signals from the sensor 46.

At block 98, the control system 60 determines whether a user of the vehicle 10 has pushed the door opening button 48 to trigger the opening sequence of the fuel door 16. If yes, the control system 60 commands the audio actuator 64 to broadcast sound messages 66 at block 100. The sound messages 66 provide feedback to the user about the status of the fuel system 12 and the fuel door 16 opening processes.

Next, at block 102, the control system 60 monitors whether the pressure of the fuel tank 20 is within a threshold pressure range. If yes, the vehicle method 68 may proceed to block 104 at which time the actuator 142 is controlled to move the fuel door 16 to the ajar position X'.

The control system 60 may next determine whether the user has closed the fuel door 16 after refueling at block 106. If no, the control system 60 may command the audio actuator 64 to broadcast sound messages 66 and/or display a message inside the passenger cabin at block 108. In either event, the vehicle method 94 may end at block 110.

The vehicle fuel systems of this disclosure include door opening modules for controlling the door opening sequence of a fuel door of the fuel systems. The exemplary door opening modules allow the fuel door opening to be performed automatically by the vehicle while disallowing manual opening and allowing for single-action closures. The audio actuators of the proposed fuel systems provide feedback to the users throughout the process, thereby providing a more positive user experience and reducing user complaints.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A fuel system for a vehicle, comprising:
   a fuel tank;
   a fuel door;
   a door opening module configured to move the fuel door;
   a control system configured to command the door opening module to move the fuel door to an ajar position when a pressure of the fuel tank is within a predefined pressure range; and
   a vibration exciter configured to broadcast sound messages prior to moving the fuel door to the ajar position,
   wherein the vibration exciter is configured to vibrate a vehicle body component to radiate the sound messages,
   wherein the sound messages include chimes, ticks, or buzzes that increase in rapidity the closer the pressure of the fuel tank becomes to reaching the predefined pressure range.

2. The fuel system as recited in claim 1, wherein the control system is configured to command the vibration exciter to broadcast the sound messages until the pressure reaches the predefined pressure range.

3. The fuel system as recited in claim 1, wherein the door opening module includes a motor and a cam for moving the fuel door to the ajar position.

4. The fuel system as recited in claim 3, wherein the motor includes a worm screw configured to engage a worm gear of the cam.

5. The fuel system as recited in claim 3, wherein the cam pushes against the fuel door or a hinge arm attached to the fuel door in the ajar position and does not push against the fuel door or the hinge arm in a closed position.

6. The fuel system as recited in claim 1, wherein the door opening module includes a door opening button and a sensor configured to detect a position of the fuel door.

7. The fuel system as recited in claim 1, wherein the door opening module includes a polymeric enclosure that is mounted to a rear surface of a housing of a fuel door assembly.

8. A vehicle, comprising:
   a vehicle body component;
   a fuel door assembly mounted to the vehicle body component and including a fuel door;
   a fuel tank;
   an audio actuator mounted to the vehicle body component;
   an actuator configured to move the fuel door between a closed position and an ajar position; and
   a control system configured to (a) command the audio actuator to broadcast sound messages while the fuel door is in the closed position, and (b) command the actuator to move the fuel door to the ajar position when the pressure of the fuel tank is within the predefined pressure range,
   wherein the audio actuator is a vibration exciter configured to vibrate the vehicle body component to radiate the sound messages,
   wherein the sound messages include chimes, ticks, or buzzes that increase in rapidity the closer the pressure of the fuel tank becomes to reaching the predefined pressure range.

9. The vehicle as recited in claim 8, wherein the vehicle body component is a rear side panel.

10. The vehicle as recited in claim 8, wherein the fuel door assembly and the fuel tank are part of a Non-Integrated Refueling Canister Only System (NIRCOS).

11. The vehicle as recited in claim 8, wherein the actuator is a motor configured to engage a cam for moving the fuel door to the ajar position.

12. The vehicle as recited in claim 11, wherein the motor includes a worm screw configured to engage a worm gear of the cam.

13. The vehicle as recited in claim 8, wherein the control system commands the audio actuator to broadcast the sound messages in response to an input from a door opening button.

14. The vehicle as recited in claim 8, comprising a sensor configured to detect a position of the fuel door.

15. A method, comprising:
   receiving an input from a door opening button of a vehicle fuel door assembly, the input indicative of an initiation of a fuel door opening sequence;
   broadcasting sound messages to a user located near the vehicle fuel door assembly during the fuel door opening sequence,
   wherein a vibration exciter is configured to vibrate a vehicle body component to radiate the sound messages; and
   automatically moving a fuel door of the vehicle fuel door assembly to an ajar position in response to a pressure of a fuel tank reaching a predefined pressure range,
   wherein the sound messages include chimes, ticks, or buzzes that increase in rapidity the closer the pressure of the fuel tank becomes to reaching the predefined pressure range.

16. The fuel system as recited in claim 1, wherein the control system is configured to actuate the vibration exciter via an electrical signal.

* * * * *